3 Sheets--Sheet 1.

R. WILSON.

Horse-Hay Rakes.

No. 6,214. Reissued Jan. 5, 1875.

WITNESSES
E. H. Bates
G. J. Clasi

INVENTOR,
Robert Wilson,
Chipman & Fosnum & Co.,
ATTORNEYS

THE GRAPHIC CO. PHOTO-LITH. 39 & 41 PARK PLACE, N.Y.

3 Sheets--Sheet 2.

R. WILSON.

Horse-Hay Rakes.

No. 6,214. Reissued Jan. 5, 1875.

WITNESSES
E. H. Bates
F. J. Clasi

INVENTOR
Robert Wilson
Chipman & Fosnum
ATTORNEYS

THE GRAPHIC CO. PHOTO-LITH. 39 & 41 PARK PLACE, N.Y.

R. WILSON.

Horse-Hay Rakes.

No. 6,214. Reissued Jan. 5, 1875.

WITNESSES
E. H. Bates
F. J. Allasi

INVENTOR
Robert Wilson,
Chipman & Fraser & C.
ATTORNEYS.

THE GRAPHIC CO. PHOTO-LITH. 39 & 41 PARK PLACE, N.Y.

UNITED STATES PATENT OFFICE.

ROBERT WILSON, OF ITHACA, NEW YORK.

IMPROVEMENT IN HORSE HAY-RAKES.

[Specification forming part of Letters Patent No. 156,005, dated October 13, 1874; reissue No. 6,214, dated January 5, 1875; application filed December 12, 1874.

*To all whom it may concern:*

Be it known that I, ROBERT WILSON, of Ithaca, in the county of Tompkins and State of New York, have invented a new and valuable Improvement in Horse Hay-Rakes; and I do hereby declare that the following is a full, clear, and exact description of the construction and operation of the same, reference being had to the accompanying drawings making a part of this specification, and to the letters and figures of reference marked thereon.

Figure 1:
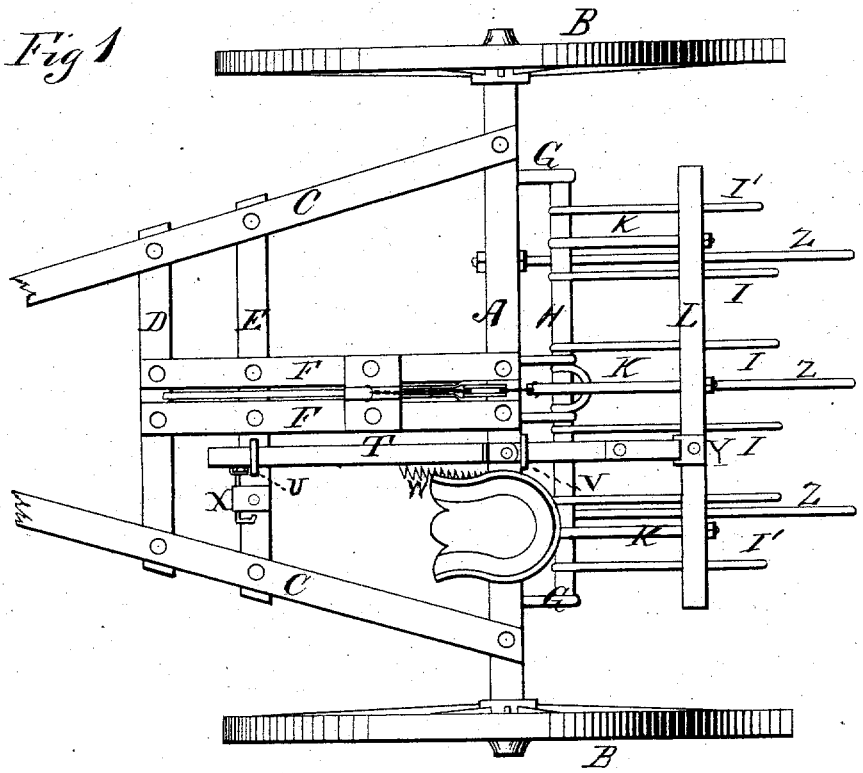
Figure 2:
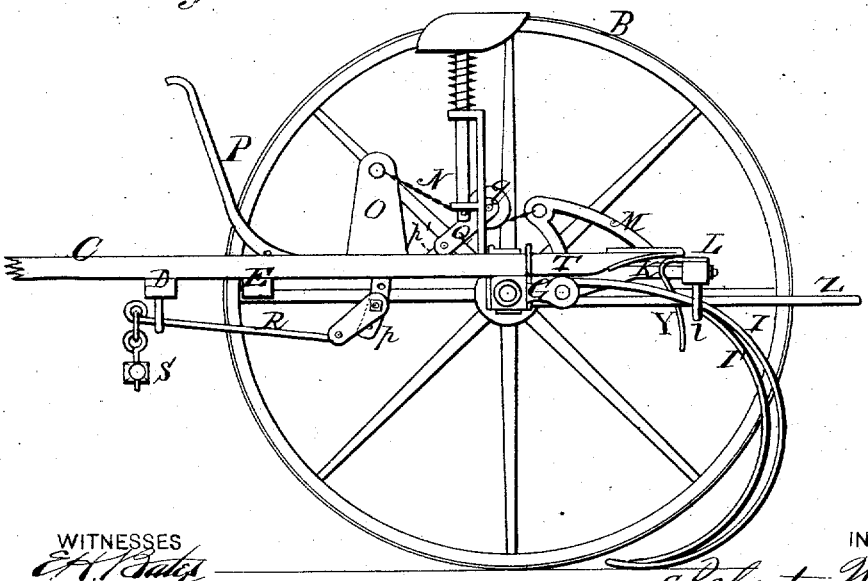
Figure 3:
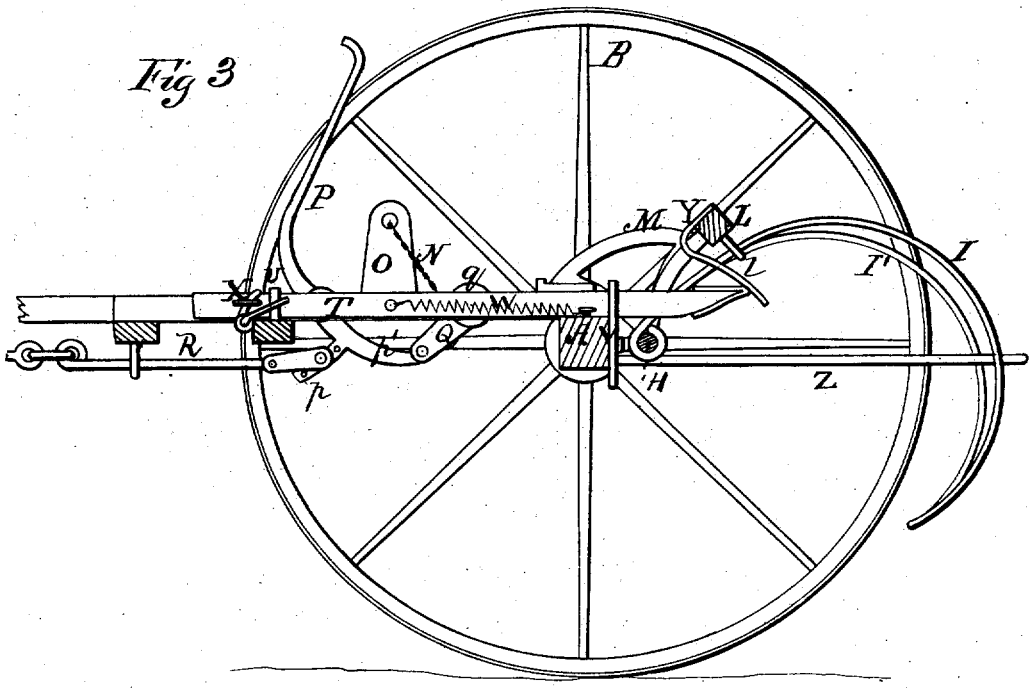
Figure 4:
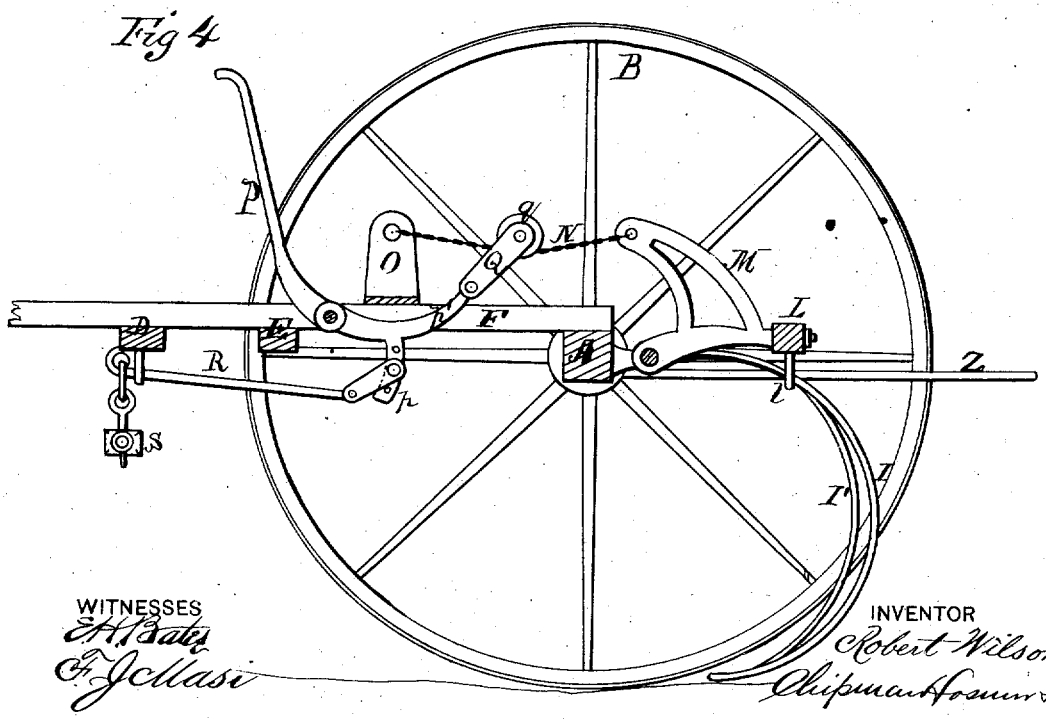
Figure 5:
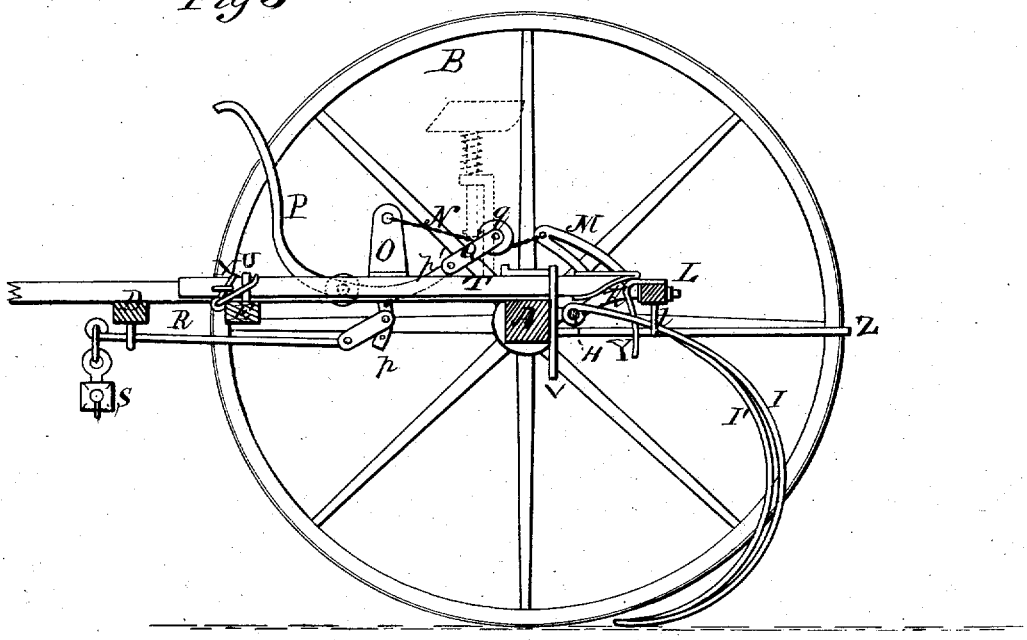
Figure 6:
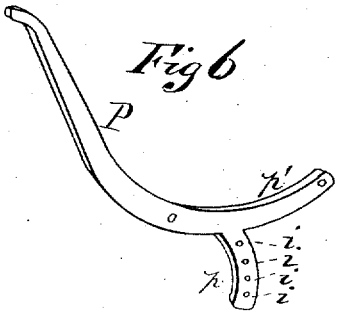
Figure 7:
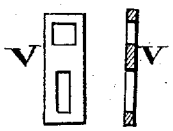

Figure 1 of the drawings is a plan view of my horse hay-rake. Fig. 2 is a side elevation of the same with the near supporting-wheel removed; and Figs. 3, 4, and 5 are longitudinal vertical sections. Figs. 6 and 7 are detail views.

This invention has relation to horse hay-rakes wherein the teeth are adapted, by means of certain mechanisms, to be lifted upward for the purpose of discharging their load. The object of the invention is to increase the efficiency and ease of operation of such a rake, without in any degree impairing the necessary solidity and durability of its various parts. To this end the invention consists in a device, substantially as hereinafter described, for holding the rake-teeth down to their work. It also consists in the means employed for adjusting the vertical position of the rake-teeth with relation to the frame of the machine and to the ground. It furthermore consists in a three-pronged lever, pivoted to the frame, and vibrating in the length thereof, of which prongs one is adapted for use as a power-arm, whereby a second prong is actuated to raise the teeth and discharge their load, and the third prong as a means whereby the said lever is adapted to be adjustably connected with the draft, for the purpose of utilizing the same for raising the teeth and discharging their load, all as will be hereinafter more fully explained.

In the annexed drawings, A designates the axle of my machine, supported upon two transporting-wheels, B, and having attached to its upper side two shafts, C, extending forward a suitable distance, and converging toward each other. These shafts are connected together by two cross-bars, D E, which are arranged in lines parallel to each other and to the said axle. At a point midway between the shafts C two bars, F, are rigidly secured to the axle A and to the cross-bars D and E, the said bars being arranged in lines parallel to each other and to the line of draft, the said bars, longitudinal bars, axle, and shafts constituting the frame of the machine. Extending rearward from the axle A are two or more lugs, G, within which is placed a rod, H, which serves as a bearing for, and upon which are pivoted, the front upper ends of the curved rake-teeth I I′. At suitable points between the said teeth on the rod H are pivoted the ends of two or more bars, K, which from thence extend to the rear, and are rigidly secured to a wooden bar, L, passing horizontally and transversely across the upper part of the said teeth, and loosely connected to the same by means of a number of staples, *l*. These staples are attached to and depend from the lower side of bar L, one of the same passing beneath and around each of the said teeth. M designates a bell-crank, pivoted to the rod H at or near the center of its length, the rear angular end of which is attached, in any suitable manner, to the pressure-bar L, while to its front end is secured one end of a chain, N, which thence extends forward and is attached to a standard, O, which latter is rigidly secured to and extends vertically upward from the longitudinal frame-bars F. Immediately in front of the standard O is a lever, P, pivoted to the frame of the rake, as shown in Figs. 4 and 5 of the drawings, having an arm or prong, *p*, extending downward therefrom, as shown in detail, Fig. 6, for a purpose hereinafter explained. The weight-arm *p′* of this lever curves rearwardly, and in a direction slightly upward, and has pivoted thereto one end of a bar, Q, within the other bifurcated end of which a grooved pulley-wheel, *q*, has it bearings, the said wheel resting upon the upper side of the chain N, which latter is received and held in the open end of the said bar, as shown in Figs. 2, 4, and 5.

It will be seen from the above description that, when the power-arm of lever P is thrust to the rear, its lower end will be depressed, carrying with it the bar Q and pulley *q*, thus depressing the chain N at its center, and causing the bell-crank M to be vibrated forward and downward, thereby actuating the pressure-bar L, and through it the rake-teeth I I′, to vibrate vertically upward into position for allowing the gavel or load to drop therefrom, under the impulse or start imparted thereto by the usual strippers Z.

In order that the power of the draft-animal may be utilized for the purpose of tripping the rake, a draft-rod, R, is attached to arm *p* of lever P, which rod extends forward within suitable supports, and is attached to the single-tree S; consequently, the power of the draft upon the said rod will actuate the tripping-lever, when the same is released from the restraint of a suitable locking or holding device.

The rake-teeth are held down to the ground by means of an endwise-movable bar, T, guided in bearings U V, respectively attached to the cross-bar E and axle A, the rear end of the said bar bearing upon the upper part of the pressure-bar L, and preventing the same from rising.

When a sufficient load has been collected by the rake-teeth in the forward movement of the machine, the locking-bar T may be disengaged from the pressure-bar L by thrusting forward the power end of a foot-lever, X, pivoted upon the cross-bar E, and loosely connected with the front end of the said locking-bar, when a slight touch, or rearward actuation of the hand-lever P, at once permits the draft of the animal to actuate the tripping-lever and dump the load.

A re-engagement of the locking-bar T with the pressure-bar L is secured by the reaction of a spring, W, attached to the said locking-bar and to the axle A, when the teeth I I′ are lowered to the ground after dumping their load; and a curved guide or bearing plate, Y, attached to the front side of the pressure-bar L, and bearing against the rear end of the locking-bar T, will cause the said bar to be automatically pressed forward as the bar L and the rake-teeth I I′ are dropped into position after having been raised.

In order that the position of the lower ends of the teeth with relation to the surface of the ground may be varied to correspond with the height of the horse used, the bearing V is made vertically adjustable, thus enabling me to depress or raise the rear end of the bar T as circumstances may require; and in order that the hay being gathered may be kept from contact with the wheels, the outer teeth I′ are curved inward in advance of the remaining teeth I, thereby throwing the hay inward instead of outward and effectually preventing such contact.

With a view to increasing or lessening the leverage of the arm *p* upon the tripping-lever P, in accordance with amount of power necessary for tripping the teeth and discharging their load, the said arm is provided with a number of spaced perforations, *i*, by means of which the rod R may be adjustably attached in one or the other of these perforations in accordance with the amount of power required.

What I claim as new is—

1. In combination with the pivoted rake-teeth I I′ and the pressure-bar L, the bell-crank M, chain N, lever P, forked bar Q, and grooved pulley *q*, substantially as and for the purpose specified.

2. In combination with the locking-bar T, the vertically-adjustable bearing V, substantially as specified.

3. The three-pronged lever P, pivoted to the frame of a rake, and adapted for use in connection with a draft-rod, R, and the device for raising the rake-teeth, substantially as specified.

In testimony that I claim the above I have hereunto subscribed my name in the presence of two witnesses.

ROBERT WILSON.

Attest:

CHARLES BUNDY,
JOHN J. ELLIS.